(12) United States Patent
Ishiguro et al.

(10) Patent No.: US 7,380,855 B2
(45) Date of Patent: Jun. 3, 2008

(54) CONTAINER APPARATUS OF A VEHICLE

(75) Inventors: Kei Ishiguro, Toyota (JP); Akihiko Kozuka, Toyota (JP); Minoru Chida, Toyota (JP)

(73) Assignees: Kojima Press Industry Co., Ltd., Toyota-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/712,926

(22) Filed: Mar. 2, 2007

(65) Prior Publication Data

US 2007/0205627 A1 Sep. 6, 2007

(30) Foreign Application Priority Data

Mar. 6, 2006 (JP) ............................. 2006-059108

(51) Int. Cl.
*B60R 7/04* (2006.01)

(52) U.S. Cl. ..................................................... 296/37.1

(58) Field of Classification Search ............... 296/37.1, 296/37.8, 37.12; 292/340
See application file for complete search history.

(56) References Cited

U.S. PATENT DOCUMENTS

| 2,195,542 | A | * | 4/1940 | Shaffer et al. ................. 292/66 |
| 6,669,243 | B2 | * | 12/2003 | Katoh et al. .................... 292/34 |
| 7,036,852 | B2 | * | 5/2006 | Cho ............................ 292/33 |
| 7,156,440 | B2 | * | 1/2007 | Katagiri ..................... 296/37.12 |
| 7,182,373 | B2 | * | 2/2007 | Yamada ........................ 292/32 |
| 7,188,871 | B2 | * | 3/2007 | Nemoto et al. ............. 292/170 |
| 7,204,527 | B2 | * | 4/2007 | Geurden ...................... 292/122 |
| 2003/0006616 | A1 | * | 1/2003 | Katoh et al. ................... 292/32 |
| 2004/0189012 | A1 | * | 9/2004 | Katou et al. ................... 292/34 |
| 2005/0044904 | A1 | * | 3/2005 | Horngren et al. ............. 70/57.1 |
| 2005/0104380 | A1 | * | 5/2005 | Cho ............................. 292/33 |
| 2006/0055196 | A1 | * | 3/2006 | Yamada ................... 296/37.12 |
| 2007/0114809 | A1 | * | 5/2007 | Yukihara et al. ........... 296/37.8 |

FOREIGN PATENT DOCUMENTS

| JP | 2003-148026 | 5/2003 |
| JP | 2003-314120 | 11/2003 |
| JP | 2004-211383 | 7/2004 |
| JP | 2004-211386 | 7/2004 |

* cited by examiner

*Primary Examiner*—H Gutman
(74) *Attorney, Agent, or Firm*—Kenyon & Kenyon LLP

(57) ABSTRACT

A container apparatus of a vehicle which may include (a) a fixed member, (b) a movable member movable relative to the fixed member, (c) a slider having a longitudinal direction and provided to a first member, which is one of the fixed member and the movable member, so as to be slidable relative to the first member, (d) a slider biasing member biasing the slider in one direction in the longitudinal direction of the slider, (e) a lock device having a hook engaging portion and a hook engageable with the hook engaging portion, one of the hook engaging portion and the hook being provided in the slider and the other of the hook engaging portion and the hook being provided in a second member which is the other of the fixed member and the movable member, and (f) a knob device provided to the first member and including a push-type knob which pulls the slider in a direction opposite the one direction in which the slider biasing member biases the slider.

7 Claims, 8 Drawing Sheets

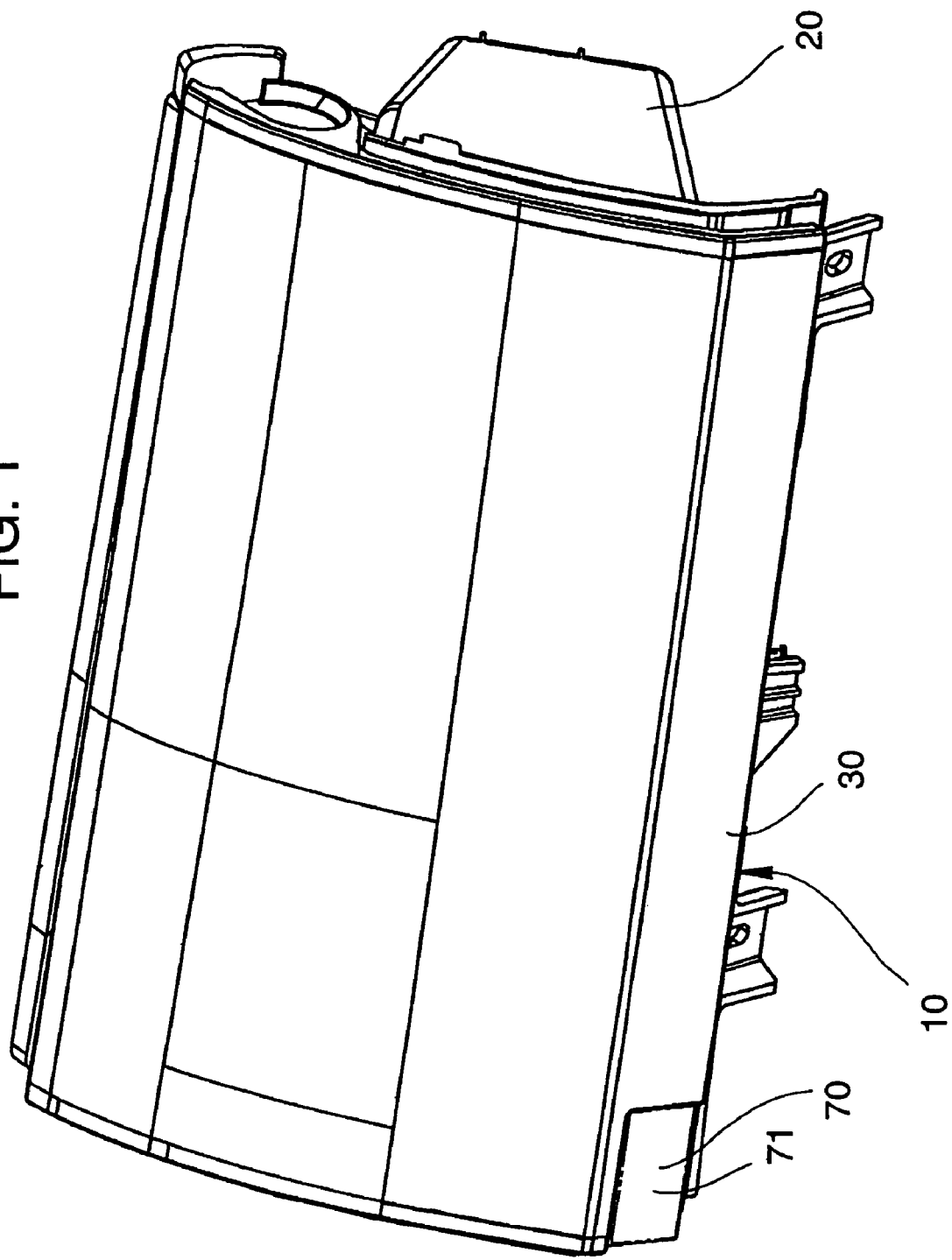

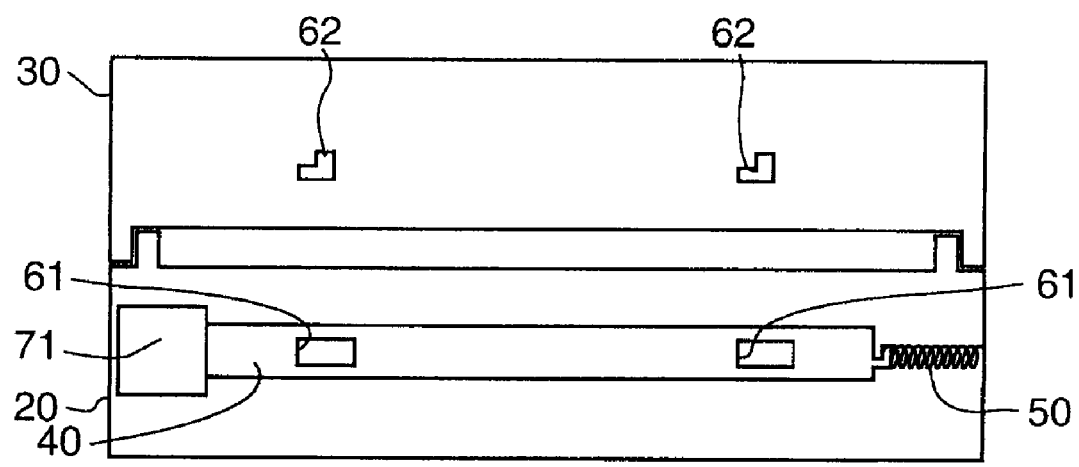
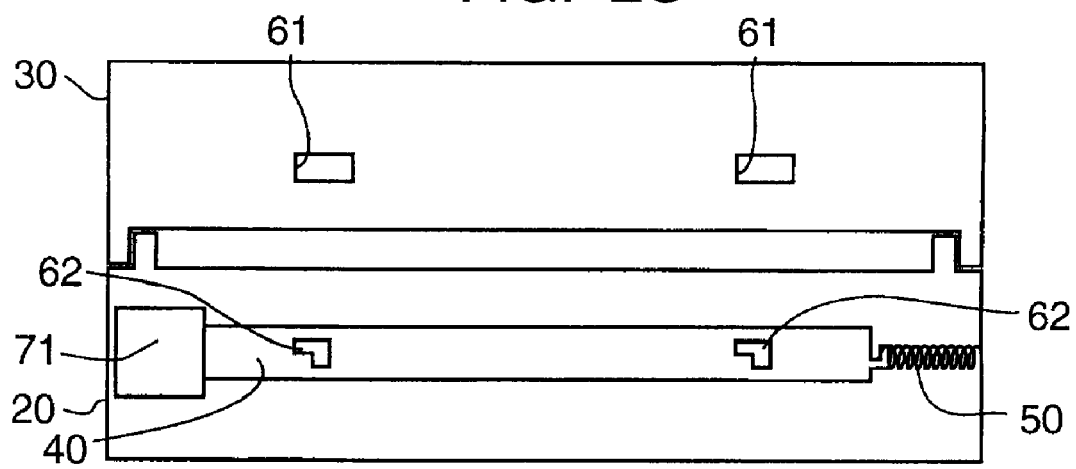

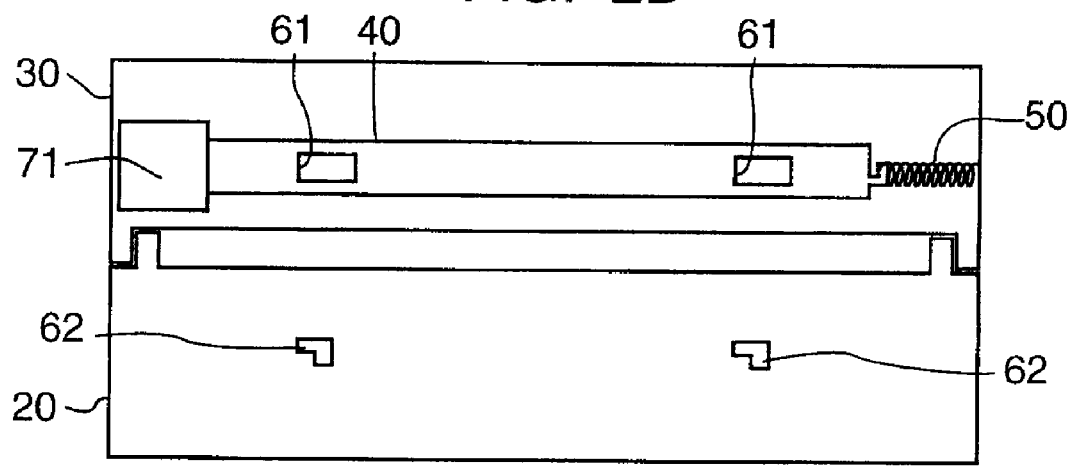
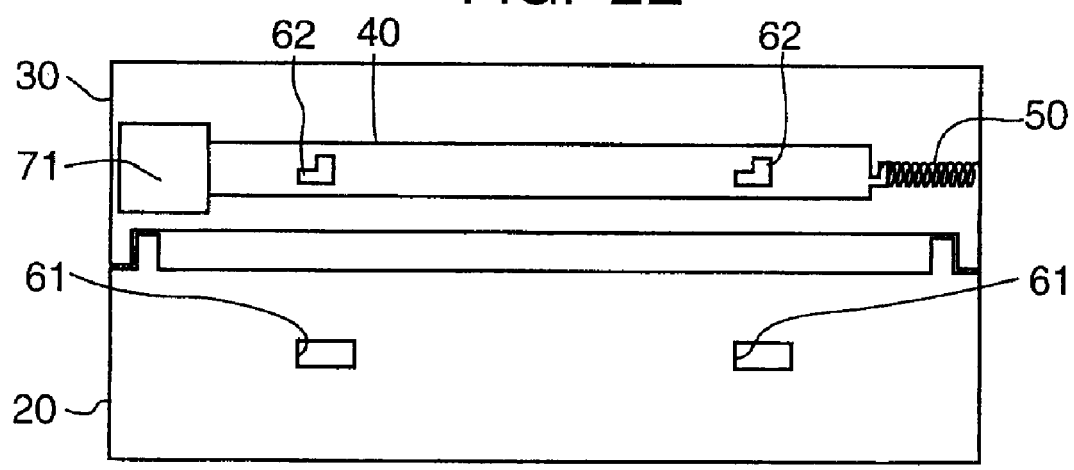

CONTAINER APPARATUS OF A VEHICLE

BACKGROUND

1. Field of the Invention

The present invention relates to a container apparatus of a vehicle.

2. Description of Related Art

Japanese Patent Publication 2003-148026 discloses a container apparatus of a vehicle which, as illustrated in FIGS. 6 and 7, includes a fixed member 1 fixed to a vehicle, a movable member 2 movable relative to the fixed member 1 so as to be pulled out from the fixed member and pushed into the fixed member, and a slider 3 provided slidably relative to the movable member 2 in a vertical direction. Two hook engageable portions 4 are provided on the fixed member 1 at portions of the fixed member different from each other in a transverse direction (a right and left direction) of the fixed member. Two hooks 5 are provided on the slider 3 so as to be engageable with the hook engageable portions 4 when the movable member is positioned in the fixed member. A knob 6 is provided in the movable member 2 at a transverse center of the movable member so as to be rotatable relative to the movable member in a plane in which the movable member is moved relative to the fixed member. The knob 6 moves down the slider 3 when the knob 6 pushes down the transverse center of the slider 3. Since the knob 6 is rotated, the movable member 2 may be a concave 7 shaped portion which allows a finger to handle the knob by entering a space 8 between a surface of the concave 7 shaped portion and the knob.

With the above-described container apparatus, there may be the following drawbacks:

(a) It may be difficult to locate the knob at a position offset from the transverse center of the movable member.

If the knob were located at a transverse end portion of the movable member, the knob may push down the slider accompanied by rotation of the slider about a transverse center of the slider. As a result, it can be difficult to move the slider in the vertical direction via the knob. This may mean that it is difficult to locate the knob at the transverse end portion of the movable member. When the knob is provided to an upper box or a glove box in front of a front passenger seat of a vehicle at a transverse center of the upper box or the glove box, the knob can be positioned far away from a driver, whereby handling of the knob is not easy.

(b) A size of the container apparatus may be increased in the vertical direction.

Since the slider is movable in the vertical direction, a vertical size of the container apparatus may be increased.

When a transverse dimension between the two hooks is large, a transverse dimension of the slider to which the hooks are provided is also large. In that case, in order to cause the slider to move smoothly in the vertical direction, a larger vertical sized slider may be required. As a result, the vertical size of the container apparatus is also larger.

(c) An external appearance of the movable member may be degraded by including the concave shaped portion.

Since the knob is rotatably coupled to the movable member, the movable member is required to have the concave shaped portion to allow a finger to enter between the surface of the concave shaped portion and the knob, which makes the external appearance quality of the movable member low.

BRIEF DESCRIPTION

Some embodiments of the present invention may provide a container apparatus of a vehicle where a knob can be disposed at a position transversely offset from a transverse center of a member to which the knob is coupled.

Still other embodiments of the present invention may provide a container apparatus of a vehicle where a vertical size of the container apparatus can be small compared with a size of the conventional container apparatus (for example, a container apparatus of Japanese Patent Publication 2003-148026).

Still yet other embodiments of the present invention can provide a container apparatus which has an improved external appearance compared with an external appearance of the conventional container apparatus (for example, a container apparatus of Japanese Patent Publication 2003-148026).

Certain embodiments of the present invention may include a container apparatus of a vehicle.

(1) The container apparatus of a vehicle according to certain embodiments of the present invention may include a fixed member, a movable member, a slider, a slider biasing member, a lock device, and a knob device. The fixed member may be fixed to a vehicle. The movable member can be movable relative to the fixed member so as to open and be closed. The slider can have a longitudinal direction and may be provided to a first member which is one of the fixed member and the movable member so as to be slidable in the longitudinal direction of the slider relative to the first member. The slider biasing member can bias the slider in the longitudinal direction of the slider. The lock device may have a hook engaging portion and a hook engageable with the hook engaging portion. One of the hook engaging portion and the hook can be provided on the slider, and the other of the hook engaging portion and the hook can be provided on a second member which is the other of the fixed member and the movable member and to which the slider is not provided. The knob device may be provided to the first member. The knob device may include a push-type knob which pulls the slider in a direction opposite the one direction in which the slider biasing member biases the slider when the knob is pushed.

(2) A plurality of the hook engaging portion can be provided. A plurality of hooks may also be provided. The one of the plurality of hook engaging portions and hooks can be provided on the slider and can be disposed at positions different from each other in the longitudinal direction of the slider.

(3) The container apparatus can be any one of an upper box and a glove box which are disposed at an instrument panel in front of a front passenger seat of a vehicle. The longitudinal direction of the slider is directed in a transverse direction (a right and left direction) of a vehicle.

(4) The slider may have a hole at a portion of the slider close to an end in the direction opposite the one direction in which the slider biasing member biases the slider. The slider can have a slider inclined surface formed at a portion of a periphery of the hole. The knob device can include a knob inclined surface. The knob inclined surface may slidably contact the slider inclined surface and pull the slider in the direction opposite the one direction in which the slider biasing member biases the slider when the knob is pushed.

(5) The first member to which the slider is provided may be the fixed member, and the second member may be the movable member.

(6) The slider extends in a transverse direction (a right and left direction) of a vehicle.

(7) The knob may be offset from a center of a transverse direction (a right and left direction) of the container apparatus so that the knob can be closer to a driver seat of the vehicle than the center of a right and left direction of the container apparatus.

According to the container apparatus discussed in items (1)-(7) above, since the knob device pulls the slider in the longitudinal direction of the slider in opposition to the biasing force of the slider biasing member, although the knob device is located at a position offset in the transverse direction from the transverse center of the member to which the knob device is provided, the slider can be moved by the knob device in the longitudinal direction of the slider. As a result, the knob device can be disposed at a position closer to a driver than the transverse center of the member to which the knob device is provided.

Further, since the slider may extend and can be slidable in the longitudinal direction of the slider, by directing the longitudinal direction of the slider to a direction other than the vertical direction, for example, to the transverse direction (the right and left direction) of the vehicle, the vertical size of the container apparatus can be made compact.

Further, since the knob is of a push-type, there is no need to form a concave shaped portion in the member to which the knob device is provided to allow a finger for handling the knob to enter beneath the knob and at a rear side of the knob. Consequently, an external appearance of the knob may be improved. In contrast, in the conventional apparatus having a rotatable knob, the concave shaped portion is required.

According to the container apparatus according to item (2) above, since a plurality of the hook engaging portions and the hooks may be provided, the hooks can engage with the hook engaging portions in a plurality of positions. If the hooks engage with the hook engaging portions located at either one of right and left portions of the movable portion, an eccentric load can be loaded on the movable member and may deform the movable member if the movable member is exposed to a high temperature, so as over a long period of time in the summer. In contrast, in the present invention, since two hook engaging loads are loaded on the movable member at right and left portions of the movable member, the movable member is not likely to be deformed.

According to the container apparatus according to item (3) above, since the longitudinal direction of the slider may be directed in the transverse direction of the vehicle, a vertical size of the container apparatus can be made compact compared with the conventional container apparatus.

According to the container apparatus according to item (4) above, since the hole is formed in the slider and the slider inclined surface is formed in a portion of the periphery of the hole, and since the knob device has a knob inclined surface which slidably contacts the slider inclined surface, the slider can be pulled in the direction opposite the one direction in which the slider biasing member biases the slider, by pushing the knob.

BRIEF DESCRIPTION OF THE DRAWINGS

The above and other objects, features, and advantages of the present invention will become apparent and will be more readily appreciated from the following detailed description of the embodiments of the present invention in conjunction with the accompanying drawings, in which:

FIG. 1 is a perspective view of a container apparatus of a vehicle according to an embodiment of the present invention in a state where a movable member is at a closed position;

FIG. 2B is a schematic view of the container apparatus of FIG. 2A, where a slider is provided at a fixed member, a hook is provided at a movable member, and a hook engaging portion is provided at the slider;

FIG. 2C is a schematic view of a container apparatus of a first alteration of the container apparatus of FIG. 2A, where the slider is provided at the fixed member, the hook is provided at the slider, and the hook engaging portion is provided at the movable member;

FIG. 2D is a schematic view of a container apparatus of a second alteration of the container apparatus of FIG. 2A, where the slider is provided at the movable member, the hook is provided at the fixed member, and the hook engaging portion is provided at the slider;

FIG. 2E is a schematic view of a container apparatus of a third alteration of the container apparatus of FIG. 2A, where the slider is provided at the movable member, the hook is provided at the slider, and the hook engaging portion is provided at the fixed member.

FIG. 4 is a cross-sectional view of the slider, the lock device and the knob device of the container apparatus of a vehicle of FIG. 1 in a state where lock of the lock device is ON;

DETAILED DESCRIPTION

FIGS. 1-5 illustrate a container apparatus of a vehicle according to an embodiment of the present invention.

As illustrated in FIGS. 1 and 2A to 2E, the container apparatus 10 of a vehicle according to an embodiment of the present invention is, for example, an upper box disposed at an instrument panel in front of a front passenger seat of the vehicle. The container apparatus 10 is not limited to the upper box, and may be a glove box disposed at the instrument panel in front of the front passenger seat of the vehicle, or another container of the vehicle or a cup holder of the vehicle disposed at the instrument panel or a position of the vehicle other than the instrument panel.

Figure 3:
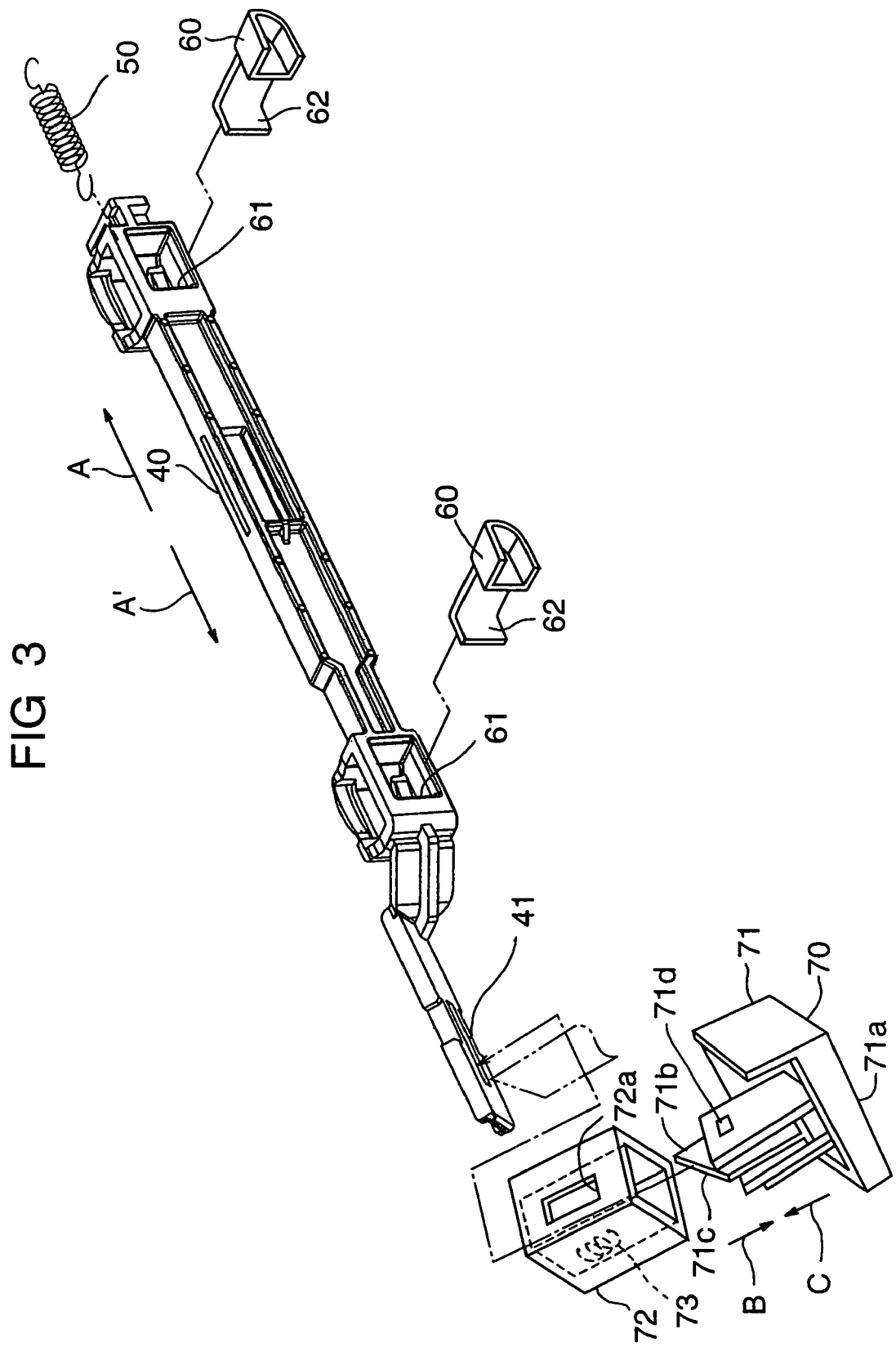
FIG. 3 is a perspective view of disassembled parts including the slider, a slider biasing member, a lock device and a knob device of the container apparatus of a vehicle of FIG. 1.

The container apparatus 10 of a vehicle includes a fixed member 20 and a movable member 20. As illustrated in FIG. 3, the container apparatus 10 further includes a slider 40, a slider biasing member 50, a lock device 60 and a knob device 70.

Figure 2A:
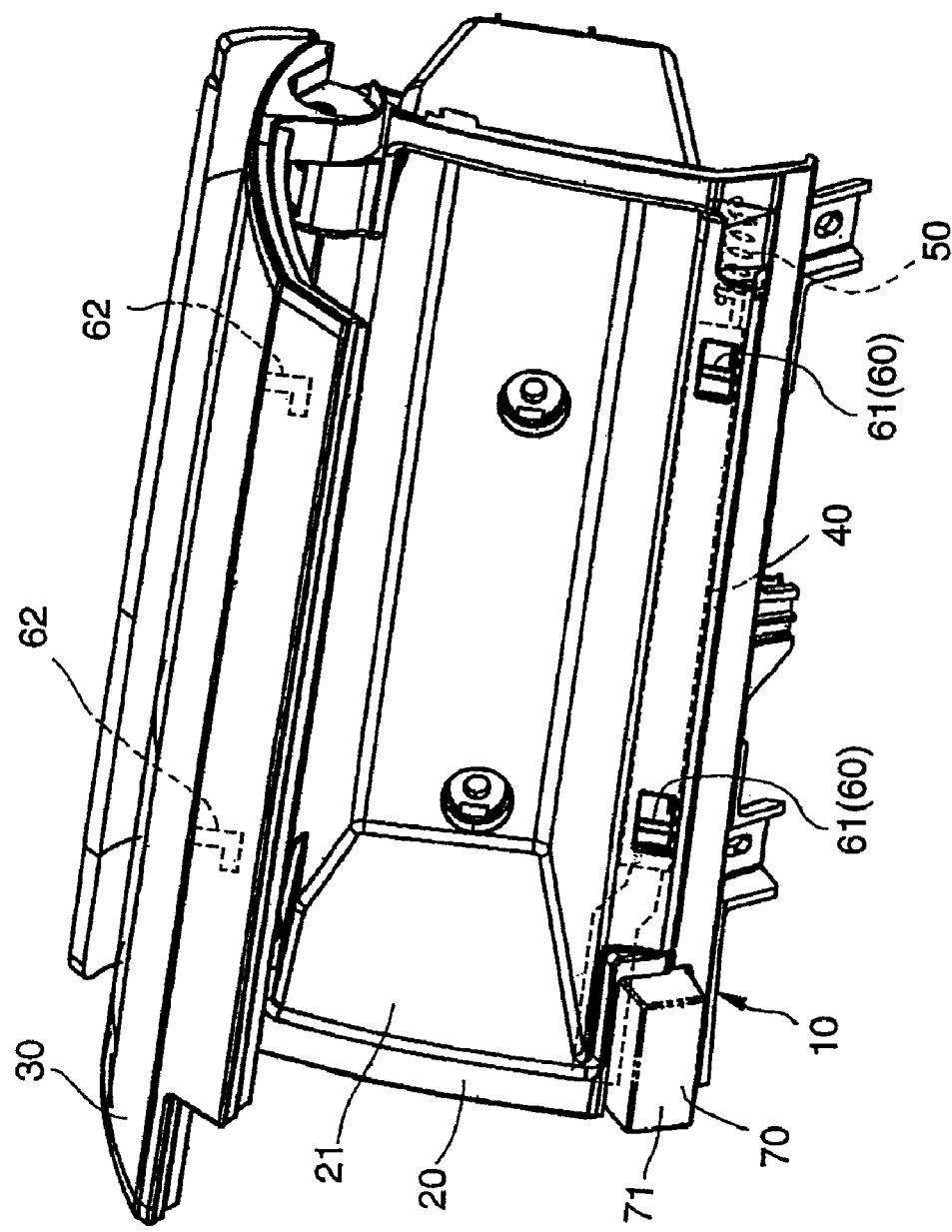
FIG. 2A is a perspective view of the container apparatus of a vehicle of FIG. 1 in a state where the movable member is at an open position.

The fixed member 20 is fixed to the vehicle, for example, to the instrument panel of the vehicle. The fixed member 20 may be formed integrally with the instrument panel, or, alternatively may be made separately from the instrument panel so that it is fixed to the instrument panel or to some other member fixed to the instrument panel. As illustrated in FIG. 2A, the fixed member 20 has a housing portion 21 for housing some goods therein when the movable member 30 is open.

The movable member 30 is movable relative to the fixed member 20 between open and closed positions. When the lock of the lock device 60 is Off, the movable member 30 is rotated toward, above, and about a rotational axis located at an upper end portion of the movable member by a movable member biasing member (not shown) to an open position. When the movable member 30 is to be closed, the movable member 30 is manually moved below and about the rotational axis in opposition to a biasing load of the movable member biasing member. When the movable member 30 is rotated to a closed position, the lock of the lock device 60 becomes ON and the movable member 30 continues its locked state.

The slider 40 is made from, for example, synthetic resin. As illustrated in FIGS. 1 and 3, the slider 40 is like a bar having a longitudinal axis and extends in the longitudinal axis of the slider (i.e., a right and left direction or a vehicle, that is, a transverse direction of a vehicle). A longitudinal length of the slider 40 is equal to or shorter than a length of the container apparatus 10 in the transverse direction of a vehicle.

The slider 40 is provided to a first member which is either one of the fixed member 20 and the movable member 30 such that the slider 40 is slidable relative to the first member in the longitudinal direction A-A' of the slider (i.e., in the transverse direction of the vehicle). In the embodiment shown, the slider 40 is installed to the fixed member 20 so as to be slidable in the longitudinal direction of the slider 40, but it is to be understood that the slider may be installed to the movable member 30. The slider 40 is biased in one direction (direction A in FIG. 3) in the longitudinal direction of the slider 40 by the slider biasing member 50.

The slider 40 is disposed at a lower end portion of the fixed member 20 or in the vicinity of the lower end portion of the fixed member 20. The slider 40 has a hole 41 formed in the slider 40 so as to penetrate the slider 40.

Figure 4:
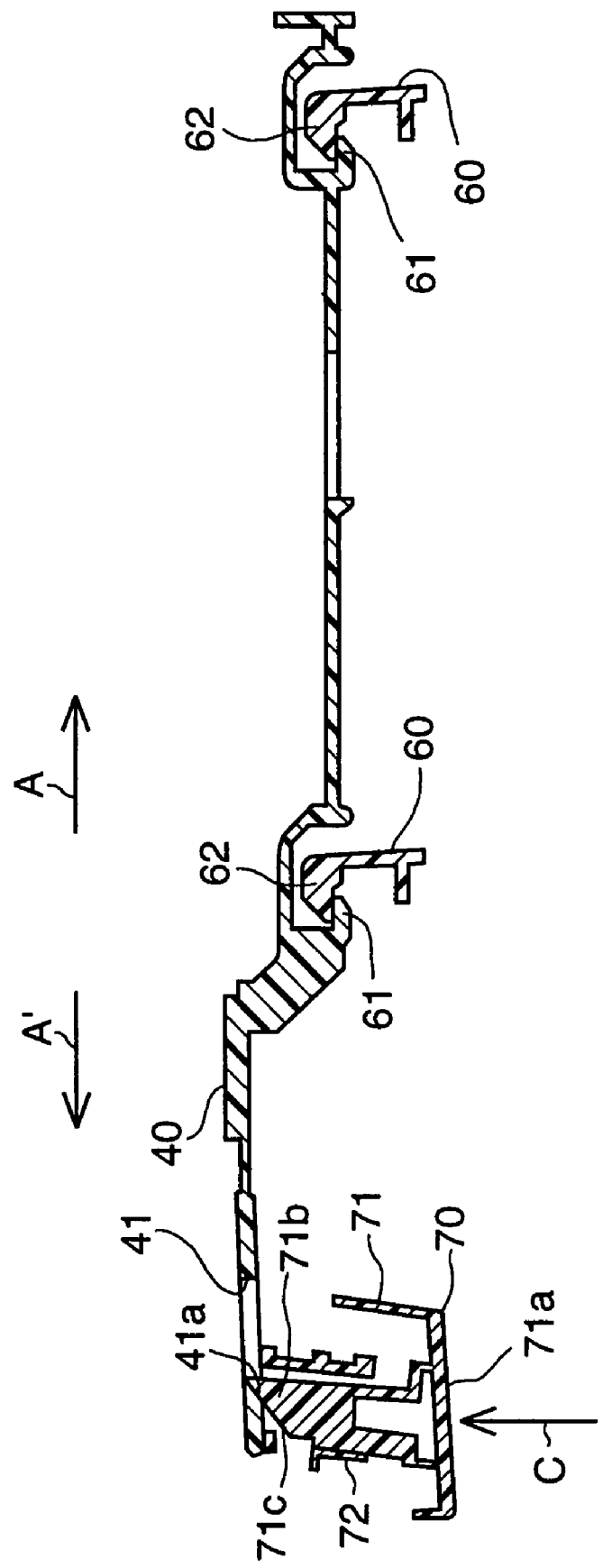
Figure 5:
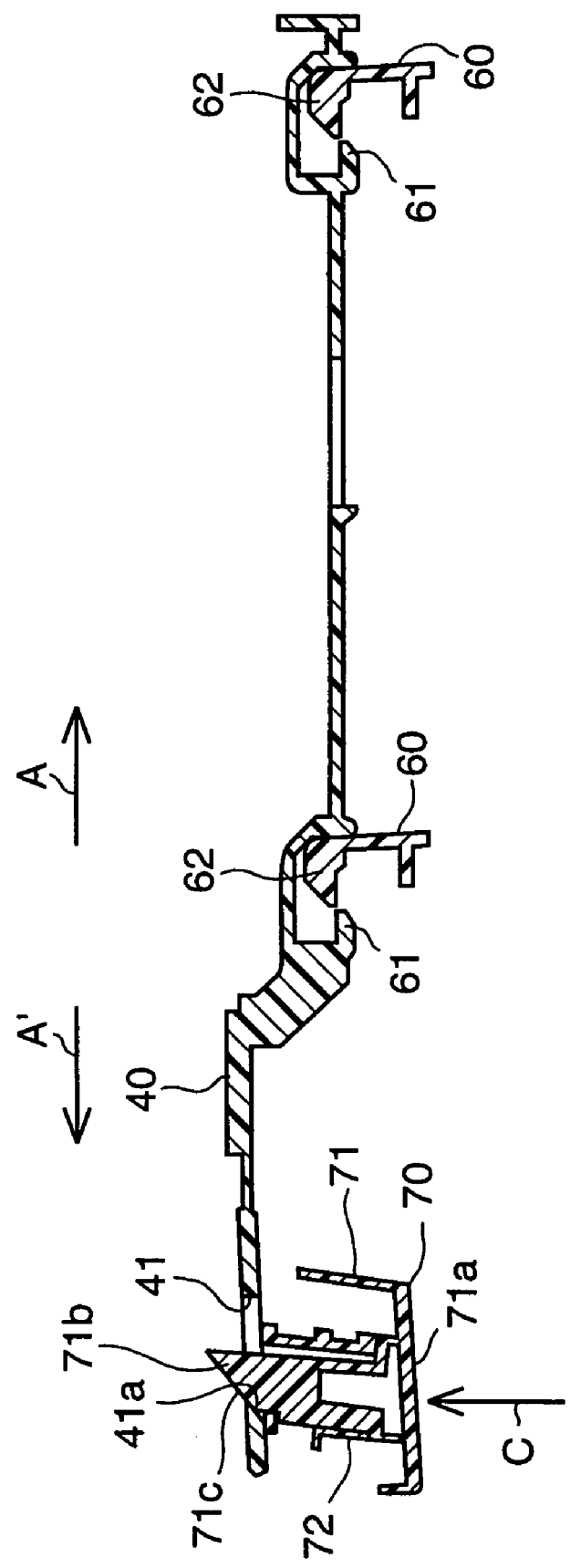
FIG. 5 is a cross-sectional view of the slider, the lock device and the knob device of the container apparatus of a vehicle of FIG. 1 in a state where lock of the lock device is OFF.

The hole 41 is positioned at a portion of the slider close to an end in a direction A' opposite the direction A in which the slider biasing member 50 biases the slider 40. As illustrated in FIGS. 4 and 5, a hole entering portion 71b of a knob 71 enters the hole 41 when the knob 71 is pushed. A slider inclined surface 41a is formed at a portion (a side of the hole 41 closest to the end of the slider 40 in the direction A') of a periphery of the hole 41, and the slider inclined surface 41a slidably contacts the knob 71. The slider inclined surface 41a inclines toward knob 71 and toward the end of the slider 40 in the direction A'.

As illustrated in FIG. 3, the slider biasing member 50 is made from, for example, a metal coil spring. One end of the slider biasing member 50 engages with the fixed member 20 and the other end of the slider biasing member 50 engages with the slider 40.

The lock device 60 includes a hook engaging portion 61 and a hook 62 engageable with the hook engaging portion 61. One of the hook engaging portion 61 and the hook 62 is provided in the slider 40 and the other of the hook engaging portion 61 and the hook 62 is provided in a second member which is the other of the fixed member 20 and the movable member 30 and to which the slider 40 is not provided. For example, in the embodiment shown, the hook engaging portion 61 is provided to the slider 40 and hook 62 is provided to the movable member 30.

A plurality of (two, in the embodiment shown) hook engaging portions 61 are provided; however, any number of hook engaging portions may be used. The hook engaging portions 61 are located at positions different from each other in the longitudinal direction of the slider 40. All of the hook engaging portions 61 are located on one side of the hole 41 in the longitudinal direction of the slider 40.

The same number of hooks 62 as the hook engaging portions 61 are provided; however, any number of hooks may be used. In the embodiment shown, the hook 62 is fixed to the movable member 30. The hook 62 protrudes toward the fixed member 20 from the movable member 30. A tip portion of the hook 62 is bent so that the hook 62 can engage with the hook engaging portion 61. The hook 62 can engage the hook engaging portion 61 only when the movable member 30 is at a closed position with respect to the fixed member 20. When the hook 62 engages with the hook engaging portion 61, lock of the lock device 60 is ON, and when the hook 62 disengages with the hook engaging portion 61, lock of the lock device 60 is OFF.

The knob device 70 is provided to the first member which is one of the fixed member 20 and the movable member 30 and to which the slider 40 is provided. In the embodiment shown, the first member is the fixed member 20. As illustrated in FIGS. 3-5, the knob device 70 includes the knob 71 of a push-type (not a rotation-type), a knob housing 72 supporting the knob 71 such that the knob 71 is movable straightly in a direction in parallel with a knob pushing direction C, and a knob biasing spring 73 biasing the knob 71 in a direction B opposite to the knob pushing direction C. The knob pushing direction C is perpendicular or substantially perpendicular to the longitudinal direction of the slider 40.

The knob 71 is supported by the knob housing 72 so as to be slidable relative to the knob housing 72 in a direction parallel to the knob pushing direction C. The knob 71 includes a pushing portion 71a where the knob 71 is pushed, and the hole entering portion 71b which enters the hole 41 of the slider 40 when the knob 71 is pushed, a knob inclined surface 71c formed at a side of the hole entering portion 71b, and a knob slip-out preventing protrusion 71d.

As illustrated in FIGS. 4 and 5, the knob inclined surface 71c is inclined in the same direction as the slider inclined surface 41a of the hole 41. The knob inclined surface 71c contacts the slider inclined surface 41a and is slidable relative to the slider inclined surface 41a. When the knob 71 is pushed, the knob inclined surface 71c and the slider inclined surface 41a slide to each other so that the slider 40 is pulled in the direction A' opposite the direction A in which the slider biasing member 50 biases the slider 40 in opposition to the biasing force of the slider biasing member 50. Since the hole 41 is located at a portion of the slider close to an end in the direction A', the knob 71 pulls the slider 40 at a portion of the slider close to an end in the direction A'.

The knob housing 72 is fixed to the fixed member 20. As illustrated in FIG. 3, the knob housing 72 has an engaging portion 72a with which the knob slip-out preventing protrusion 71d engages. Since the knob slip-out preventing protrusion 71d engages with the engaging portion 72a, the knob 71 is prevented from slipping out from the knob housing 72 in the direction (direction B is FIG. 3) opposite to the knob pushing direction.

The knob biasing spring 73 is, for example, a metal coil spring. One end of the knob biasing spring 73 engages with the knob 71 and the other end of the knob biasing spring 73 engages with the knob housing 72.

Operation and technical advantages of the container apparatus 10 according to the present invention will now be explained.

Since the slider 40 extends in the transverse direction of the vehicle, and since the knob device 70 pulls the slider 40 in the direction A' in opposition to the biasing force of the slider biasing member 50, although the knob device 70 is located at a position offset in the transverse direction from the transverse center of the member (for example, the fixed member 20) to which the knob device 70 is provided, the slider 40 can be relatively smoothly moved by the knob device 70 in the longitudinal direction of the slider 40. As a result, the knob device can be disposed at a position closer to a driver than the transverse center of the member (for example, the fixed member 20) to which the knob device 70 is provided, or the transverse center of the container apparatus 10. In that case, the knob device 70 is positioned relatively close to the driver seat of the vehicle and therefore is positioned within a reach of a driver, so that handling the knob 71 by the driver is relatively easy.

Further, since the slider 40 extends and is slidable in the longitudinal direction of the slider 40, by directing the longitudinal direction of the slider 40 to a direction other than the vertical direction, for example, to the transverse direction (the right and left direction) of the vehicle, the size of the container apparatus 10 can be made compact in the vertical direction.

Since the slider 40 extends in the longitudinal direction of the slider 40, even if a span between the hook engaging portions 61 is large (for example, nearly equal to the length of the slider 40), a vertical size of the slider 40 is not required to be increased and can be maintained relatively small.

Further, since the knob 71 is of a push-type, there is no need to form a concave (a concave for disposing the knob therein) shaped portion in the member (for example, fixed member 20) to which the knob device 70 is provided to allow a finger to handle the knob 70 by entering beneath the knob 71 at a rear side of the knob 71. Moreover, an external appearance of the container apparatus 10 can be improved in comparison with the conventional apparatus (of FIGS. 6 and 7) where the space 8 is required to be provided between the rotatable knob 6 (rotatable in direction R in FIG. 7) and the surface of the concave 7 for a finger to enter therethrough.

Since a plurality of hook engaging portions 61 and hooks 62 are provided, the hooks 62 can engage with the hook engaging portions 61 in a plurality of positions. If only one hook engaging portion and only one hook are provided and the only one hook engages with the only one hook engaging portion at either one of right and left portions of the movable portion offset from the transverse center of the movable portion, an eccentric load will be loaded on the movable member and the eccentric load may deform the movable member when the movable member is exposed to a high temperature (e.g., in the summer for a long time period). In contrast, in the present invention, since two hook engaging loads are loaded on the movable member 30 at right and left portions of the movable member 30, the loads are symmetrical with each other and the movable member 30 is prevented from being deformed even at high temperatures during the summer.

Figure 6:
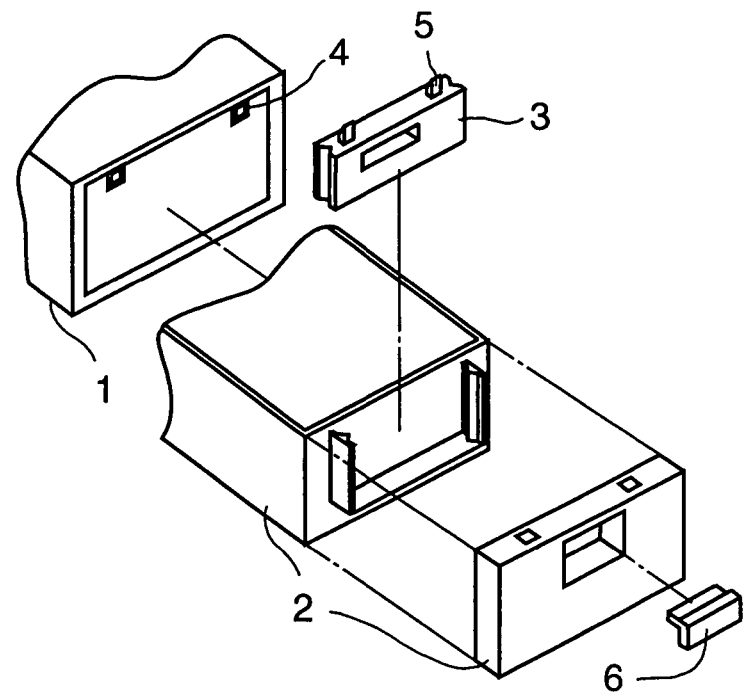
FIG. 6 is a perspective view of disassembled parts of a conventional container apparatus.
Figure 7:
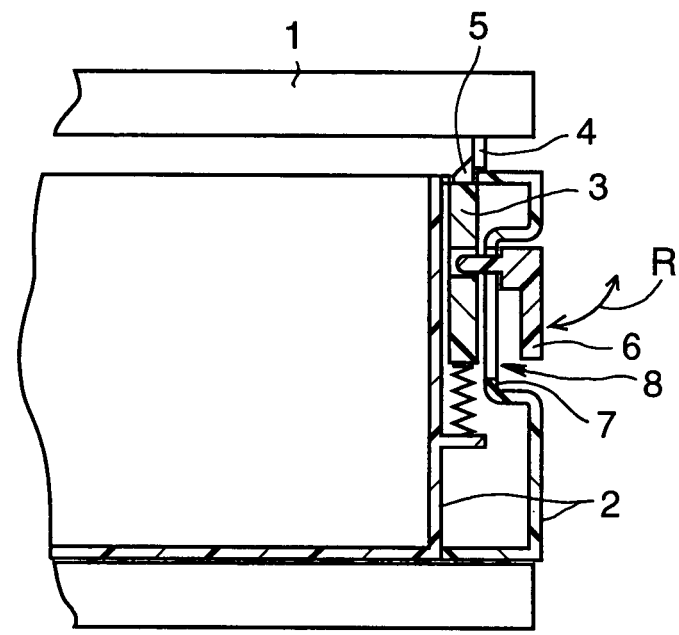
FIG. 7 is a cross-sectional view of the conventional container apparatus of FIG. 6.

Since the longitudinal direction of the slider 40 is directed in the transverse direction (the right and left direction) of the vehicle, a vertical size of the container apparatus 10 can be made compact compared with the conventional container apparatus of FIGS. 6 and 7.

Since the hole 41 is formed in the slider 40 and the slider inclined surface 41a is formed in a portion of the periphery of the hole 41, and since the knob device 70 has the knob inclined surface 71c which slidably contacts the slider inclined surface 41a, the slider 40 can be pulled in the direction A' opposite the one direction A in which the slider biasing member 50 biases the slider 40, by pushing the knob 71 into the hole 41 of the slider 40.

Although certain embodiments of the present invention have been described with reference to certain exemplary embodiments, it will be appreciated by those skilled in the art that various modifications and alterations can be made to the particular embodiments shown without materially departing from the novel teachings and advantages of the embodiments of the present invention. Accordingly, it is to be understood that all such modifications and advantages are included within the spirit and scope of the present invention as defined by the following claims.

What is claimed is:

1. A container apparatus of a vehicle comprising:
   (a) a fixed member fixed to a vehicle;
   (b) a movable member movable relative to the fixed member between open and closed positions;
   (c) a slider having a longitudinal direction and provided to a first member which is one of the fixed member and the movable member so as to be slidable in the longitudinal direction of the slider relative to the first member;
   (d) a slider biasing member biasing the slider in one direction in the longitudinal direction of the slider;
   (e) a lock device having a hook engaging portion and a hook engageable with the hook engaging portion, one of the hook engaging portion and the hook being provided in the slider and the other of the hook engaging portion and the hook being provided in a second member which is the other of the fixed member and the movable member and to which the slider is not provided; and
   (f) a knob device provided to the first member and including a push-type knob which pulls the slider in a direction opposite the one direction in which the slider biasing member biases the slider when the knob is pushed.

2. A container apparatus according to claim 1, wherein the hook engaging portion is a plurality of hook engaging portions and the hook is a plurality of hooks provided in the same number as the hook engaging portions, the one of the hook engaging portions and the hooks in the slider being disposed at positions different from each other in the longitudinal direction of the slider.

3. A container apparatus according to claim 1, wherein the container apparatus is any one of an upper box and a glove box which are disposed at an instrument panel in front of a front passenger seat of the vehicle, and the longitudinal direction of the slider is directed in a right and left direction of the vehicle.

4. A container apparatus according to claim 1, wherein the slider has a hole on a portion of the slider close to an end in the direction opposite the one direction in which the slider biasing member biases the slider and a slider inclined surface formed at a portion of a periphery of the hole, and the knob device includes a knob inclined surface which slidably contacts the slider inclined surface and pulls the slider in the direction opposite the one direction in which the slider biasing member biases the slider when the knob is pushed.

5. A container apparatus according to claim 1, wherein the first member to which the slider is provided is the fixed member and the second member is the movable member.

6. A container apparatus according to claim 1, wherein the slider extends in a right and left direction of the vehicle.

7. A container apparatus according to claim 1, wherein the knob is offset from a center of a right and left direction of the container apparatus so that the knob is closer to a driver seat of the vehicle than the center of a right and left direction of the container apparatus.

* * * * *